United States Patent
Oliveira et al.

(10) Patent No.: US 10,999,216 B2
(45) Date of Patent: May 4, 2021

(54) RESOURCE ALLOCATION AND PROVISIONING IN A MULTI-TIER EDGE-CLOUD VIRTUALIZATION ENVIRONMENT

(71) Applicant: EMC IP Holding Company LLC, Hopkinton, MA (US)

(72) Inventors: Ana C. Oliveira, Rio de Janeiro (BR); Tiago Salviano Calmon, Rio de Janeiro (BR); Flavia Coimbra Delicato, Rio de Janeiro (BR); Paulo F. Pires, Rio de Janeiro (BR); Igor Leão dos Santos, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 6 days.

(21) Appl. No.: 16/034,432

(22) Filed: Jul. 13, 2018

(65) Prior Publication Data
US 2020/0021537 A1    Jan. 16, 2020

(51) Int. Cl.
*H04L 12/911* (2013.01)
*H04L 29/08* (2006.01)
*G06F 9/455* (2018.01)

(52) U.S. Cl.
CPC ............. *H04L 47/82* (2013.01); *H04L 67/10* (2013.01); *G06F 9/45558* (2013.01); *G06F 2009/45595* (2013.01)

(58) Field of Classification Search
CPC ..... H04L 47/82; H04L 67/10; G06F 9/45558; G06F 2009/45595
See application file for complete search history.

(56) References Cited

U.S. PATENT DOCUMENTS 7,444,337 B2* 10/2008 Zhou ..................... G06F 9/5044
2001/0051939 A1* 12/2001 Yoshimura .......... G06F 16/2358
(Continued)

OTHER PUBLICATIONS

Atzori et al., "The Internet of Things: A Survey," Computer Networks, No. 54, pp. 2787-2805, 2010.
(Continued)

*Primary Examiner* — Uzma Alam
(74) *Attorney, Agent, or Firm* — Ryan, Mason & Lewis, LLP

(57) ABSTRACT

Techniques are provided for resource allocation and provisioning in a multi-tier edge-cloud virtualization environment. An exemplary method comprises: obtaining an application request for processing a given data type in a multi-tier environment; processing application requests received within a decision window to allocate resources for virtual nodes to process the application requests received within the decision window, wherein the allocated resources for each virtual node is on a corresponding one of cloud resources and a given edge node; instantiating the allocated virtual nodes to process the application requests; and providing the application requests to the instantiated virtual nodes, wherein the instantiated virtual nodes obtain the data of the given data type from a data repository. The virtual node waits to process a given application request for output data of any predecessor requests and sends the output data of the given application request to any additional virtual nodes holding successor requests to the given application request.

20 Claims, 13 Drawing Sheets

(56) References Cited

U.S. PATENT DOCUMENTS

| | | | | |
|---|---|---|---|---|
| 2006/0106894 | A1* | 5/2006 | Richardson | G06F 16/273 |
| 2007/0213888 | A1* | 9/2007 | Shidai | H04J 3/0682 |
| | | | | 701/1 |
| 2007/0288524 | A1* | 12/2007 | Luick | H04L 67/1095 |
| 2014/0223444 | A1* | 8/2014 | Keeton | G06F 9/50 |
| | | | | 718/104 |
| 2015/0026567 | A1* | 1/2015 | Bots | H04W 80/06 |
| | | | | 715/242 |
| 2015/0081906 | A1* | 3/2015 | Backholm | H04L 67/322 |
| | | | | 709/225 |
| 2016/0077901 | A1* | 3/2016 | Roth | H04L 67/42 |
| | | | | 719/328 |
| 2017/0289300 | A1* | 10/2017 | Song | H04L 41/24 |
| 2019/0013954 | A1* | 1/2019 | Anand | H04L 69/22 |
| 2019/0075184 | A1* | 3/2019 | Seed, IV | H04L 67/2852 |

OTHER PUBLICATIONS

Eidson et al., "Distributed real-time software for cyber-physical systems," Proceedings of the IEEE, vol. I, No. 100, pp. 45-59, 2012.
Zhang et al., "The cloud is not enough: saving iot from the cloud," Proceedings of the 7th USENIX Conference on Hot Topics in Cloud Computing, pp. 21-21, 2015.
Koomey et al., "United States Data Center Energy Usage Report," L. B. N. Laboratory, 2016.
Lopez et al., "Edge-centric Computing: Vision and Challenges," SIGCOMM Comput. Commun. Rev., No. 45, pp. 37-42, 2015.
Li et al., "System modelling and performance evaluation of a three-tier Cloud of Things," Future Generation Comp. Syst., No. 70, pp. 104-125, 2017.

* cited by examiner

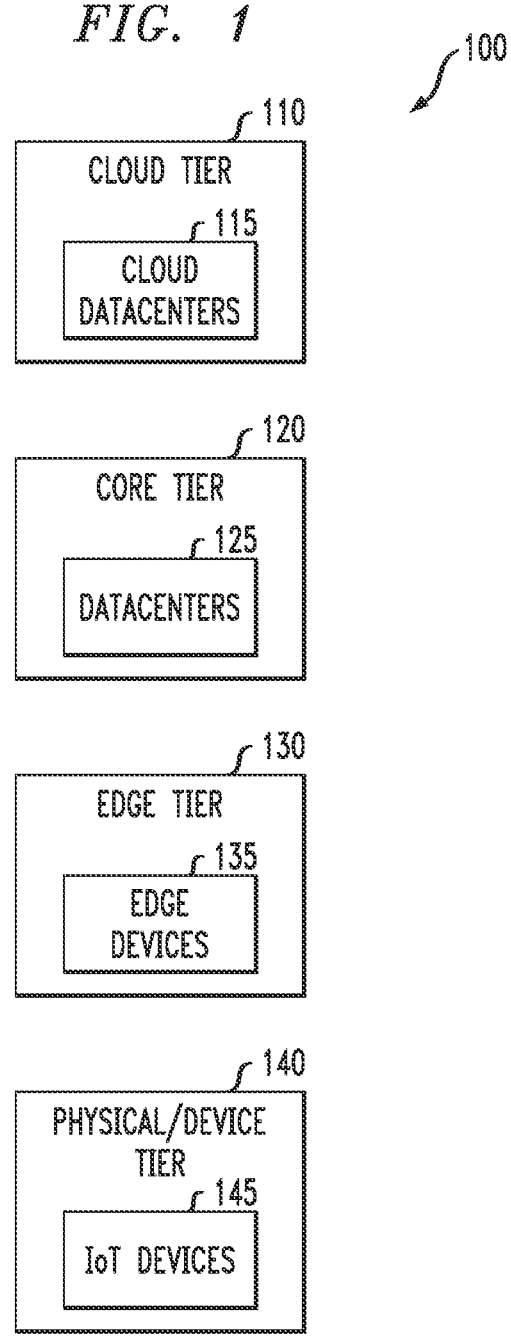

FIG. 2

SUMMARY OF SETS

| DEFINITION | DESCRIPTION | SUBSCRIPT INDEXES |
|---|---|---|
| $S_{HO} = \{h \mid h \in \mathbb{N}_0, h < H\}$ | SET OF H HOSTS OF VNs | $h, i$ |
| $S_{DT} = \{t \mid t \in \mathbb{N}_0, t < T\}$ | SET OF T DATA TYPES (i.e. VN TYPES) | $T$ |
| $S_{RQ} = \{j \mid j \in \mathbb{N}_0, j < J\}$ | SET OF J REQUESTS | $j, a, b$ |
| $S_{AP} = \{m \mid m \in \mathbb{N}_0, m < M\}$ | SET OF M APPLICATIONS | $M$ |
| $S_{PR} = \{(a,b) \mid a \in S_{RQ}, b \in S_{RQ}, a \neq b, (a,b) \mapsto z, z \in \mathbb{N}_0, z < Z\}$ | SET OF PRECEDENCES ($a$ PRECEDES $b$) | $z$ |

○ = RAW DATA REQUIRED BY EACH DATA TYPE
◯ = PREDECESSOR DATA TYPES
○ = DATA TYPE REQUESTED BY USER (REQUEST 0)

FIG. 7 700

| DECISION VARIABLES | | |
|---|---|---|
| DEFINITION | | DESCRIPTION |
| $V_{h,t} \in \{0,1\}$ $\forall h, t \in S_{HO}, S_{DT}$ | | WHETHER VN ht IS ACTIVE FOR CURRENT DECISION WINDOW |
| $Vre_{h,t} \in \{0,1\}$ $\forall h, t \in S_{HO}, S_{DT}$ | | WHETHER VN ht IS BEING RECONFIGURED FOR CURRENT DECISION WINDOW |
| $Von_{h,t} \in \{0,1\}$ $\forall h, t \in S_{HO}, S_{DT}$ | | WHETHER VN ht IS BEING TURNED ON FOR CURRENT DECISION WINDOW |
| $Voff_{h,t} \in \{0,1\}$ $\forall h, t \in S_{HO}, S_{DT}$ | | WHETHER VN ht IS BEING TURNED OFF FOR CURRENT DECISION WINDOW |
| $Vc_{h,t} \in \mathbb{N}_0$ $\forall h, t \in S_{HO}, S_{DT}$ | | AMOUNT OF CORES FROM ECN h DEDICATED TO VN OF TYPE t |
| $x_{j,h} \in \{0,1\}$ $\forall j, h \in S_{RQ}, S_{HO}$ | | WHETHER ECN h IS ALLOCATED TO REQUEST j |
| $y_j \in \{0,1\}$ $\forall j \in S_{RQ}$ | | WHETHER REQUEST j IS MET WITH UPDATED DATA |
| $STT_j \in \mathbb{R}_{>0}$ $\forall j \in S_{RQ}$ | | START OF INITIAL TRANSMISSION (FROM AEP TO ALLOCATED VN) OF REQUEST j |
| $SPB_j \in \mathbb{R}_{>0}$ $\forall j \in S_{RQ}$ | | START OF PROCESSING BEFORE UPDATE OF REQUEST j |
| $STTpre_{j,z} \in \mathbb{R}_{>0}$ $\forall j, z \in S_{RQ}, S_{PR}$ | | START OF TRANSMISSION OF EACH PREDECESSOR z.a OF REQUEST j=z.b |
| $SUT_j \in \mathbb{R}_{>0}$ $\forall j \in S_{RQ}$ | | START OF DATA UPDATE FOR REQUEST j |
| $SPA_j \in \mathbb{R}_{>0}$ $\forall j \in S_{RQ}$ | | START OF PROCESSING AFTER UPDATE FOR REQUEST j |

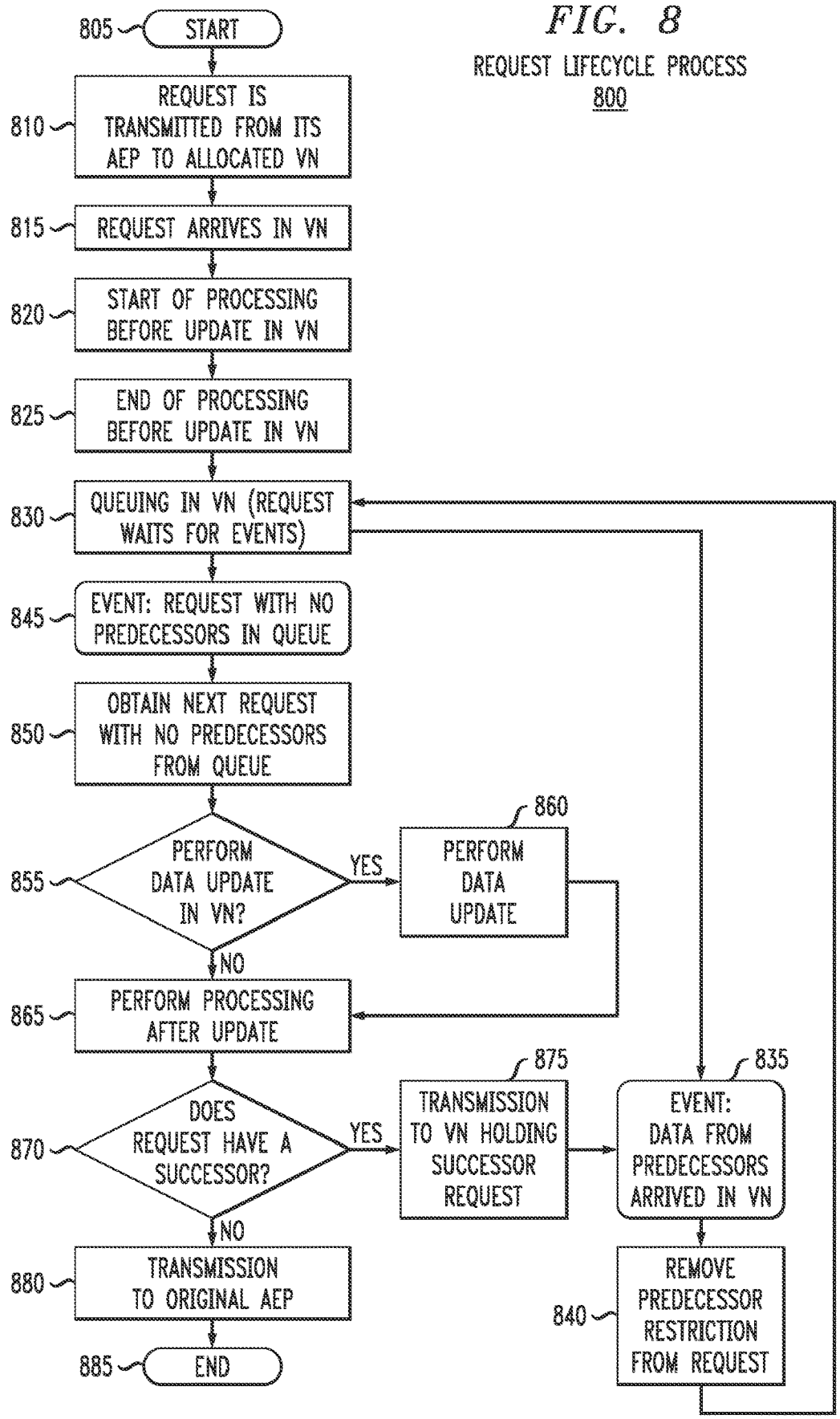

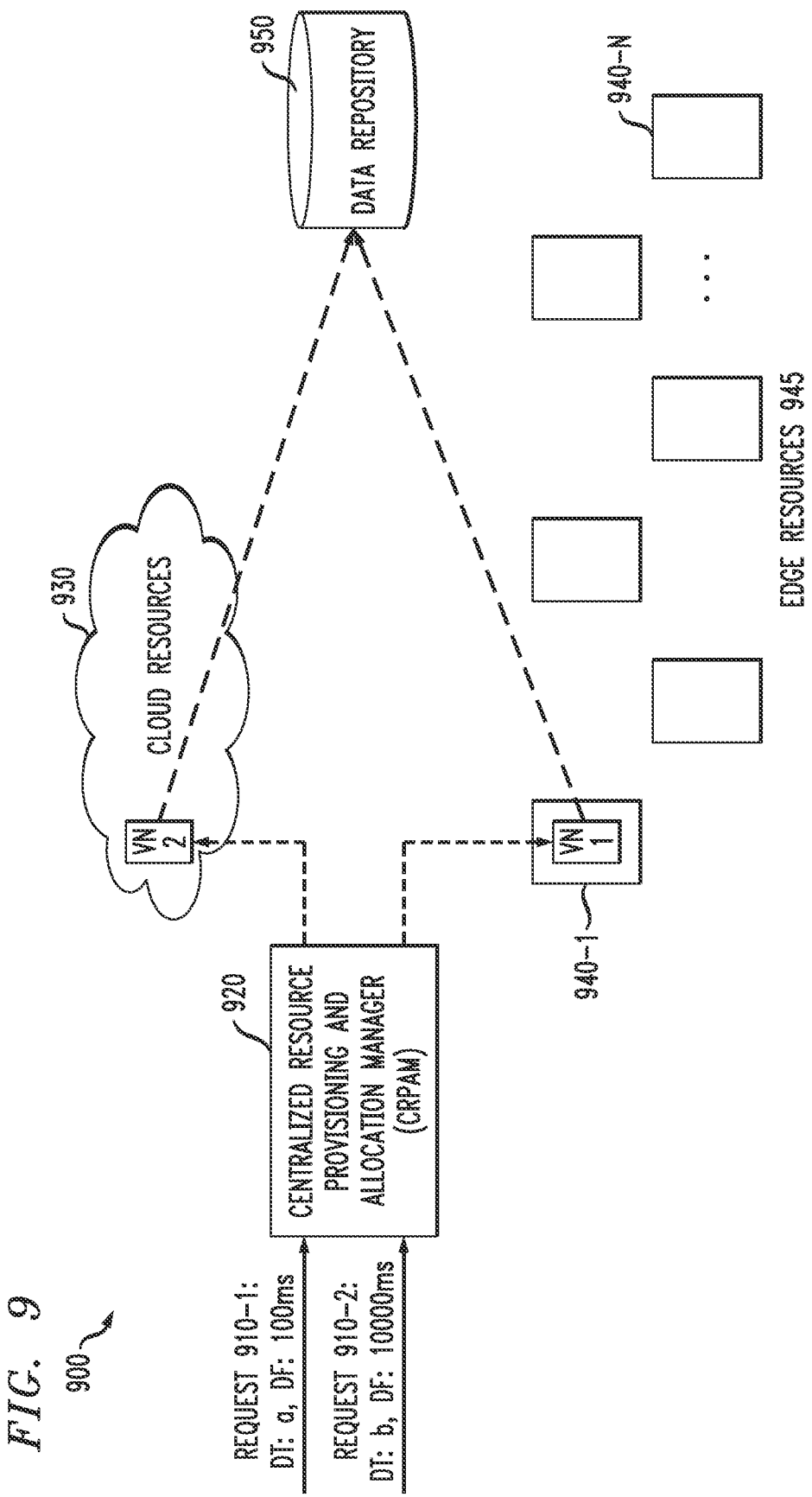

FIG. 11A

SUMMARY OF PARAMETERS

| ACRONYM | MATRIX NAME | INTERNAL/EXTERNAL TO CRPAM | DIM. SIZE | TYPE | UNIT |
|---|---|---|---|---|---|
| $BR_{hi}$ | HOSTS' BIT RATES | E | HxH | FLOAT | bps |
| $Hc_h$ | HOSTS' CORE AMOUNTS | E | H | INT | CORES |
| $Hcs_h$ | HOSTS' CORE SPEEDS | E | H | FLOAT | CYCLES/S |
| $Hram_h$ | HOSTS' RAM TO VNs | E | H | INT | BYTES |
| $Pcpu_h$ | HOSTS' FREE CPU UNIT POWER | E | H | FLOAT | JOULE/(S.CORE) |
| $Pram_h$ | HOSTS' FREE RAM UNIT POWER | E | H | FLOAT | JOULE/(S.BYTE) |
| $Pur_h$ | HOSTS' UNDERLYING RESOURCES POWER | E | H | FLOAT | JOULE/S |
| $Pbase_h$ | HOSTS' BASE RESOURCES POWER | E | H | FLOAT | JOULE/S |
| $Ptr_{hi}$ | HOSTS' TRANSMISSION POWER | E | HxH | FLOAT | JOULE/S |
| $Cel_h$ | HOSTS' ELECTRICITY COST | E | H | FLOAT | S/JOULE |
| $Tram_t$ | TYPES' RAM | E | T | INT | BYTES |

| | | | | |
|---|---|---|---|---|
| $PLoBU_t$ | TYPES' PROCESSING LOADS BEFORE UPDATE | E | T | INT | PROC. CYCL. |
| $PLoAU_t$ | TYPES' PROCESSING LOADS AFTER UPDATE | E | T | INT | PROC. CYCL. |
| $PLoBU_j$ | REQUESTS' PROCESSING LOADS BEFORE UPDATE | $PLoBU_j = \sum_t (PLoBU_t * R_{jt})$ | J | INT | PROC. CYCL. |
| $PLoAU_j$ | REQUESTS' PROCESSING LOADS AFTER UPDATE | $PLoAU_j = \sum_t (PLoAU_t * R_{jt})$ | J | INT | PROC. CYCL. |
| $TLo_t$ | TYPES' TRANSMISSION LOADS | E | T | INT | BYTES |
| $TLo_j$ | REQUESTS' TRANSMISSION LOADS | $TLo_j = \sum_t (TLo_t * R_{jt})$ | J | INT | BYTES |
| $RSz_j$ | REQUESTS' SIZES | E | J | INT | BYTES |
| $P_{ht}$ | TYPES PROVIDED | E | HxT | BOOL | -- |
| $Vpw_{ht}$ | VNs EXISTING IN PREVIOUS WINDOW | OBTAINED FROM PREV. WINDOW | HxT | BOOL | -- |
| $Vcpw_{ht}$ | AMOUNT OF CORES OF VNs IN PREV. W. | OBTAINED FROM PREV. WINDOW | HxT | INT | CORES |
| $Tre_{ht}$ | VNs' RECONFIGURATION TIMES | E | HxT | FLOAT | SECONDS |
| $Ton_{ht}$ | VNs' TURNING ON TIMES | E | HxT | FLOAT | SECONDS |

FIG. 11A con't.

FIG. 11B

SUMMARY OF PARAMETERS (CONTINUED) — 1100

| ACRONYM | MATRIX NAME | INTERNAL/EXTERNAL TO CRPAM | DIM. SIZE | TYPE | UNIT |
|---|---|---|---|---|---|
| $Toff_{h,t}$ | VNs' TURNING OFF TIMES | E | HxT | FLOAT | SECONDS |
| $CTre_{h,t}$ | VNs' RECONFIGURATION COSTS | $CTre_{h,t} = Tre_{h,t} * Pwr_h * Cel_h$ | HxT | FLOAT | $ |
| $CTon_{h,t}$ | VNs' TURNING ON COSTS | $CTon_{h,t} = Ton_{h,t} * Pwr_h * Cel_h$ | HxT | FLOAT | $ |
| $CToff_{h,t}$ | VNs' TURNING OFF COSTS | $CToff_{h,t} = Toff_{h,t} * Pwr_h * Cel_h$ | HxT | FLOAT | $ |
| $R_{j,t}$ | REQUEST'S TYPES | E | JxT | BOOL | -- |
| $D_t$ | TYPES DEMANDED | $D_t = (\sum_j R_{j,t} \geq 1)$ | T | BOOL | -- |
| $ETMDW$ | END TIME OF THE DECISION WINDOW | MUST BE CONFIGURED | -- | FLOAT | SECONDS |
| $DFT_j$ | DATA FRESHNESS THRESHOLDS | E | J | FLOAT | SECONDS |
| $RFT_m$ | RESPONSE TIME THRESHOLDS | E | M | FLOAT | SECONDS |
| $DFP_j$ | DATA FRESHNESS PRICES | E | J | FLOAT | $/s |
| $RFP_m$ | RESPONSE TIME PRICES | E | M | FLOAT | $/s |

| | | | | |
|---|---|---|---|---|
| $Sr_{mj}$ | APPLICATIONS' START REQUESTS | MUST BE CREATED | MxJ | BOOL |
| $Er_{mj}$ | APPLICATIONS' END REQUESTS | MUST BE CREATED | MxJ | BOOL |
| $AEP_{ht}$ | APPLICATION ENTRY POINTS | E | HxT | BOOL |
| $Der_j$ | REQUESTS' DATA FRESHNESS DELAY | $Der_j = \sum_t (Det_t * R_{jt})$ | J | FLOAT | SECONDS |
| $Det_t$ | TYPES' DATA FRESHNESS DELAY | E | T | FLOAT | SECONDS |
| $EUTpw_{ht}$ | VN's LAST END OF UPDATE IN PREV. W. | OBTAINED FROM PREV. WINDOW | HxT | FLOAT | SECONDS |
| $ULo_t$ | TYPES' DATA UPDATE LOADS | E | T | INT | PROC. CYCL. |
| $UTm_t$ | TYPES' DATA UPDATE TIMES | E | T | FLOAT | SECONDS |
| $ULor_j$ | REQUESTS' DATA UPDATE LOADS | $ULor_j = \sum_t (ULo_t * R_{jt})$ | J | INT | PROC. CYCL. |
| $UTmr_j$ | REQUESTS' DATA UPDATE TIMES | $UTmr_j = \sum_t (UTm_t * R_{jt})$ | J | FLOAT | SECONDS |

FIG. 11B con't.

RESOURCE ALLOCATION AND PROVISIONING IN A MULTI-TIER EDGE-CLOUD VIRTUALIZATION ENVIRONMENT

FIELD

The field relates generally to resource allocation techniques in information processing systems.

BACKGROUND

Recently, shared computing techniques (such as cloud computing techniques) have become a prominent model for business computation. Among other benefits of shared computing, companies, as well as end users, only pay for their usage, without a substantial initial investment, by scaling shared computing resources according to their needs. Virtualization is an important technology behind shared computing. Infrastructure providers rely on virtualization to support their business models, as virtualization enables an abstraction of the available resources as virtual components. To efficiently manage these resources, infrastructure providers need efficient scheduling algorithms and resource allocation policies.

Cloud-based systems demonstrate a number of limitations, which, if overcome, could further improve the utility of such shared computing environments. For example, since cloud resources are typically clusters of data centers located in specific geographic locations, the network overhead and latency of moving data into and out of the cloud needs to be addressed. The edge computing framework has emerged as a solution for a number of cloud computing issues. Edge computing proposes decentralized computation through the allocation of specific tasks to nodes at the edge of the network, that are closer to the data sources. Edge computing attempts to mitigate latency and privacy issues, for example, that are often found in cloud-based systems. With the introduction of computing devices at the edge of the network, the processing and storage demands generated by applications can be distributed through an edge-cloud system comprised of multiple tiers.

A need exists for improved techniques for allocating available resources to accommodate the application workload considering the multiple tiers.

SUMMARY

Illustrative embodiments of the present disclosure provide for resource allocation and provisioning in a multi-tier edge-cloud virtualization environment. In one embodiment, an exemplary method comprises: obtaining at least one application request for processing a given data type in a multi-tier environment comprising cloud resources and a plurality of edge nodes, wherein the application request has a data freshness constraint; processing one or more application requests received within a decision window to allocate resources for one or more virtual nodes to process the one or more application requests received within the decision window, wherein the allocated resources for the one or more virtual nodes are on a corresponding one of the cloud resources and a given one of the plurality of edge nodes based on an evaluation of the data freshness constraint; instantiating the allocated one or more virtual nodes to process the one or more application requests; and providing the one or more application requests to the one or more instantiated virtual nodes for processing by the one or more instantiated virtual nodes, wherein the one or more instantiated virtual nodes on the corresponding one of the cloud resources and the given one of the plurality of edge nodes obtains the data of the given data type from a data repository.

In some embodiments, the virtual node waits to process a given application request for output data of one or more predecessor requests. In addition, upon completion of processing a given application request, the respective virtual node sends the output data of the given application request to one or more additional virtual nodes holding one or more successor requests to the given application request.

Other illustrative embodiments include, without limitation, apparatus, systems, methods and computer program products comprising processor-readable storage media.

BRIEF DESCRIPTION OF THE DRAWINGS

FIG. 1 illustrates an exemplary multi-tier edge-cloud framework, according to some embodiments of the disclosure;

FIG. 2 illustrates exemplary sets of input parameters that may be processed in one or more exemplary embodiments;

FIG. 7 illustrates exemplary decision variables employed in one implementation of a resource provisioning and allocation problem, according to some embodiments of the disclosure;

FIG. 8 is a flow chart illustrating an exemplary implementation of a request lifecycle process, according to one embodiment of the disclosure;

FIG. 9 illustrates a resource allocation and provisioning process, according to some embodiments;

FIGS. 11A and 11B, collectively, comprise a table summarizing parameters of an exemplary resource allocation and provisioning system, according to one exemplary embodiment;

DETAILED DESCRIPTION

Figure 3:
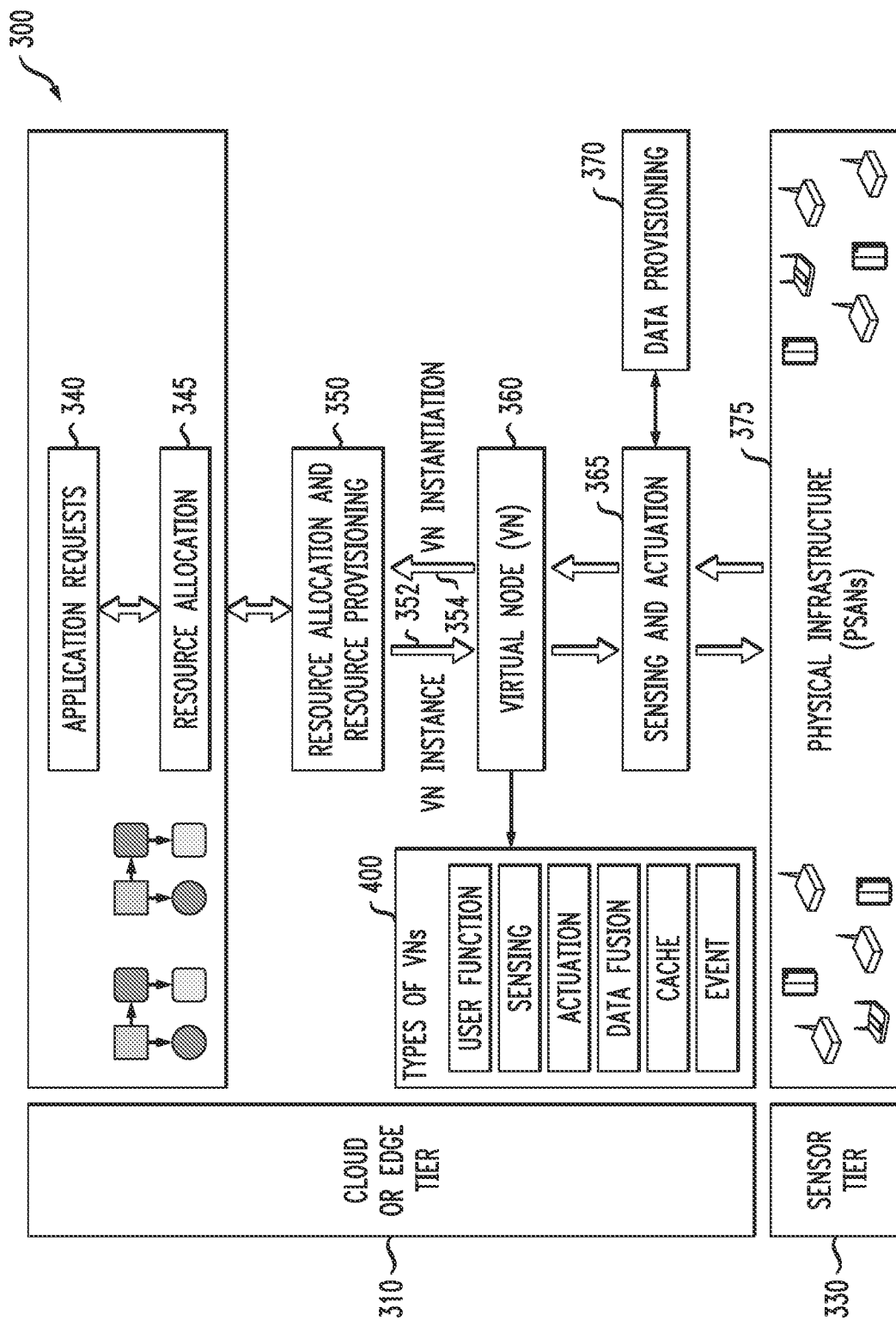
FIG. 3 illustrates an exemplary virtualization model, according to at least one embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for resource allocation and provisioning in a multi-tier edge-cloud virtualization environment.

In one or more embodiments, a multi-tier service provisioning model is provided based on a virtualization of resources both at the cloud and at the edge levels in an edge-cloud system comprised of multiple tiers. The disclosed model optionally considers the features and requirements of emergent applications and the heterogeneity of the underlying hardware.

In some embodiments, an optimization model jointly considers the resource provisioning and allocation, while distributing the workload both vertically (among the different tiers of the system) and horizontally (among nodes at the same tier) in the edge-cloud framework. The exemplary model substantially optimizes the utility of the system while meeting the quality requirements of applications using the available resources.

One goal of resource allocation in edge-cloud systems is to substantially maximize the amount of application requirements met by the infrastructure, while ensuring a target operational cost. In the context of emergent scenarios, such as IoT applications, one or more aspects of the disclosure recognize that the process of data acquisition from the underlying data sources can also be shared (in addition to, or instead of, sharing the computational, storage and communication capabilities of the infrastructure). Thus, the same data can be physically acquired only once and then shared by multiple applications via data virtualization. In this manner, functions and operations performed upon the collected data can also be shared, instead of performed multiple times for each application. To achieve this goal, a virtualization process optionally abstracts data acquisition/access to users and applications, thus allowing data sharing among applications, while meeting their individual requirements. Among the possible requirements, the data freshness stands out, given its importance for distributed systems based on sensing data. Freshness of a given data can be defined as the time elapsed since its acquisition. The disclosed virtualization model responsible to define the virtual nodes used herein employs similar data (either raw data or processed data) requested by different applications to promote resource sharing at the edge tier, thus further improving the usage of the available resources.

Cloud Native Systems are pervasive in modern Information Technology (IT) systems. Cloud-based applications rely on virtualization in order to provide services to end customers, while generating many economies to its provider. Furthermore, small and medium businesses can benefit from this approach by contracting a level of service and scaling up or down dynamically, depending on their needs. This factor simplified creation of startups, which rely on cloud services to perform their computations and to deliver the results.

Cloud-based systems, however, suffer from a number of limitations. For example, Cloud-based systems have difficulty delivering results in real time. Clouds are clusters of data centers located in specific geographic locations. Thus, the network overhead of moving data into and outside the Cloud needs to be accounted for. In some applications, including fault monitoring, fraud detection or intrusion alert, this kind of latency might be undesirable or even make the application unviable. Moreover, the fast proliferation of Internet of Things (IoT) applications has also contributed to accentuate some limitations of the native cloud paradigm. A significant portion of IoT systems comprises real-time applications with low-latency requirements. Some of these applications have humans in the loop, thus requiring an upper latency limit to avoid degrading the human perception of the application quality. Other IoT applications are part of cyber-physical systems, with autonomous behavior based on control loops that require a tight control over latency. Strict latency requirements are often incompatible with the unpredictable performance of cloud-based analytics or controllers.

Another drawback of traditional cloud platforms for IoT applications is the nature of the data generated by many of these applications. Sensors embedded in the environment often collect data of an extremely sensitive nature. Thus, sending the sensor data to remote data centers in the cloud without any kind of treatment or anonymization is not desirable, raising privacy and security concerns.

In recent years, the edge computing framework has emerged as a solution for these above-mentioned issues. Rather than doing all of the computations in the remote cloud, edge computing proposes the decentralization of the computation through the allocation of some specific tasks to nodes at the edge of the network, which are closer to the data sources. This is an attempt to mitigate the latency and privacy issues while also spending less energy due to the fact that the network would be used less.

FIG. 1 illustrates an exemplary multi-tier edge-cloud framework 100, according to some embodiments of the disclosure. In the exemplary edge computing framework 100, the computation is typically performed in one or more of a cloud tier 110, a core tier 120, an edge tier 130 and a physical/device tier 140. As shown in FIG. 1, the cloud tier 110 is comprised of one or more cloud datacenters 115, and typically provides a majority of the computational power. Therefore, the computationally heavy tasks are typically performed in the cloud tier 110. The edge tier 130 is typically represented by edge devices 135 with reduced computational power but closer to the data sources (e.g., sensors and other IoT devices 145) in the physical/device tier 140. Tasks that are not computationally intensive but respond to latency-sensitive applications should be performed in the devices 135 of the edge tier 130. The core tier 120 is an optional middle tier, in which on-premises datacenters 125 and/or private clouds are often located. The data is acquired by the sensors and actuation is performed in the physical/device tier 140. The physical/device tier 140 encompasses IoT devices (e.g., smart phones, tablets and wearables) as well as wireless sensor and actuator networks (WSANs).

Like traditional clouds, the edge computing paradigm is also heavily based on the concept of virtualization. The adoption of virtualization provides a clear decoupling between the multiple tiers of the framework and the applications, using an abstract representation of the resources. This representation comprises a computational entity (a Virtual Node—VN) that is created, instantiated and managed by the edge-cloud system. VNs can be instantiated in any of the tiers. Moreover, when an application arrives at the system, the workload generated by it must be distributed among the multiple instances of virtual nodes. Such load distribution among VNs is a resource allocation problem and respects the requirements of the applications while optimizing the use of the available infrastructure.

Within the context of this edge-cloud framework, several challenges have arisen. One of particular interest regards the allocation of available resources to accommodate the application workload considering the virtual nodes instantiated in the multiple tiers. Another challenge is ensuring that applications (e.g., time sensitive IoT applications) meet Quality of Service (QoS) requirements. This problem is particularly challenging due to the distributed nature of the applications in the edge-cloud framework: an application can request multiple services, allocated on multiple edge nodes and multiple cloud nodes from possibly different clouds.

In one or more embodiments, the present disclosure provides a methodology that encompasses both a model proposition and an optimization model in the context of edge-cloud applications. One goal is to allocate computing entities, hereby denoted by the name of Virtual Nodes (VNs), in the substantially best location to ensure that the utility for the application is substantially maximized. In at least one embodiment of the disclosure, this utility function can be mapped to profit. In another embodiment, this utility function could be achieved by minimizing the energy footprint. The utility function, thus, provides a way to map the interests of the service providers and service consumers into a mathematical expression.

The optimization aims to maximize this utility while also ensuring that the applications do not violate any of the hard constraints that can happen by both natural effect and design decisions. Decision variables are allocations, such as where to place the Virtual Nodes in the physical infrastructure and the placement time window starting point and size. The presented model deals with time sensitive and energy equations, and utility can be derived from those equations.

Considering a multi-tier edge-cloud framework, and the arrival of applications with different requirements to make use of the virtualized resources provided by the infrastructure, the need arises to solve a resource provisioning and allocation problem. Such a problem encompasses the decision on which VN should meet each application request and the decision on when (in which moment in time) the VN should meet each request in some embodiments. Moreover, in one or more embodiments, the allocation decision increases the profit and provides the substantially best utility value for the several players (infrastructure providers, device owners, end users, etc.).

A characteristic of edge computing is the ability to deal with delay sensitive applications. By offloading some of the computation to the edge tier, the network overhead is alleviated, which reduces response time and also saves energy. It is assumed that users are willing to pay for services that meet the QoS requirements, which are set, for example, by Service Level Agreements (SLAs) defined in a contract or formal agreement between customers and service providers. Therefore, in at least one embodiment of the disclosure, the utility function can be understood as the profit generated by an application.

There are service provisioning models in the cloud tier, which adopt virtualization to serve the requirements of incoming cloud applications using underlying heterogeneous hardware. There is still an open challenge to generalize these models or generate new service provisioning models that consider the cloud tier but also the other tiers, such as the core and edge tiers.

Considering an environment where customers often pay for services delivered in compliance with the aforementioned SLA acceptable terms, one problem that arises is how to provide these services to substantially maximize the utility generated to the service provider while also meeting the end customer's requirements. This is a problem of substantially maximizing the utility of the edge system operation. This utility function can take many forms, and in at least one embodiment, the utility function can be materialized as the profit of the service provider.

The goal of resource allocation in an edge-cloud system is to substantially maximize the amount of application requirements met by the infrastructure, while ensuring a target operational cost. On the other hand, the computation of the edge tier is much more impacted by the data generated by the devices. For this reason, besides virtualization of the storage, computation and communication, there is also the necessity of sharing the process of data acquisition.

Edge-Cloud Resource Allocation and Provisioning

In this context, one or more embodiments of the disclosure comprises a model and procedures to perform resource provisioning and allocation in a multi-tier edge-cloud system based on a set of virtual nodes that abstract the available resources. In the disclosed exemplary approach, both resource provisioning and allocation processes are modeled in the same optimization problem, thus decisions are jointly taken for both processes. A centralized computational entity called Centralized Resource Provisioning and Allocation Manager (CRPAM) is considered, located in a Cloud Node. In some embodiments, the CRPAM runs the optimization algorithm in order to find a global solution. A time-based decision window, defined by a fixed value of duration End Time of the Decision Window (ETMDW), is also considered. The resource provisioning and allocation decision, achieved by solving the resource provisioning and allocation problem, is valid for the duration of this decision window. Such a decision can be reviewed when the execution of the current resource provisioning and allocation decision is completed (when the decision window ends).

FIG. 2 illustrates exemplary sets of input parameters 200 that may be processed in one or more exemplary embodiments. The exemplary set of input parameters 200 are used to represent the entities considered in the exemplary embodiments: (i) Hosts of Virtual Nodes (e.g., Edge/Cloud Nodes), (ii) Data Types, (iii) Application Requests, (iv) Applications, and (v) Precedence among the Requests of a same Application.

In one or more embodiments, the Edge-Cloud Nodes (ECNs) pertain to the same network, which runs an available communication protocol over the Internet. Therefore, in some embodiments, every ECN is able to send messages to every ECN, including itself. This information can be updated in the CRPAM at the same rate of the update time of the edge network monitor.

In at least one embodiment of the disclosure, the aforementioned information is retrieved by issuing pings among all the ECNs in the network. By dividing the ping size by the latency obtained with each ping, it is possible to find the effective bits per second (bps) between each pair of hosts. If such embodiments, the bit rates are a function of the distance/number of hops between the pair of nodes. While ECNs have fixed geographical coordinates, the VN instances will be hosted in the same geographical coordinates of their host.

The Edge Nodes (ENs) typically differ from Cloud Nodes (CNs) only in terms of scale and geographical position. Usually, the ENs are referred to as micro-datacenters that are positioned close to the edge of the network, usually in a larger number when compared to the amount of CNs. Meanwhile, the CNs can be understood as high-performance clustered data centers located in the core of the network backbone. As a consequence, all ECNs generally have the same types of parameters provided as inputs to the resource allocation and provisioning problem, although CNs usually have higher capacities in every parameter compared to ENs.

FIG. 3 illustrates an exemplary virtualization model 300, according to at least one embodiment of the disclosure. As shown in FIG. 3, the exemplary virtualization model 300 comprises a cloud or edge tier (cloud/edge) 310, and a sensor tier 330. The exemplary cloud/edge tier 310 processes application requests 340 and performs a resource allocation function 345. The exemplary cloud/edge tier 310 performs a resource allocation and resource provisioning function 350. One or more VNs 360 are instantiated 354 and the VN instances 352 are reported back to the resource allocation and resource provisioning function 350. As shown in FIG. 3, the types of VNs 400, as discussed further below in conjunction with FIG. 4, in some embodiments comprise VNs for user functions (UFs), sensing (Se), actuation (Ac), data fusion (Df), cache (Ch) and events (Ev).

The cloud/edge tier 320 also coordinates with the IoT devices, for example, in the physical infrastructure 375 of the sensor tier 330, by performing a data provisioning function 370 and a sensing and actuation function 365.

In addition, it is assumed in some embodiments that every ECN dissipates a certain amount of energy due to its existence during the window, respective to every other resource that it contains, which is not used for a virtualization function or VN operation. The model, in some embodiments, also considers the power dissipated by a transmission from ECN h to ECN i. Moreover, the electricity costs at the respective ECN can be retrieved from an energy monitor at ECN h. Such energy monitor might be automated to perform a periodic check and update values in a central database in Cloud.

Figure 4:
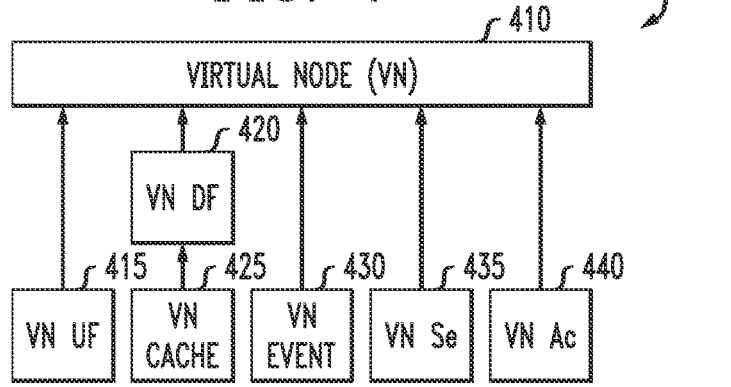
FIG. 4 illustrates the exemplary virtual node types of FIG. 3 for a virtual node in further detail, according to an embodiment.

FIG. 4 illustrates the exemplary virtual node types 400 of FIG. 3 for a virtual node 410 in further detail, according to at least one embodiment. As shown in FIG. 4, the exemplary types of VNs 400 comprise a VN for user functions (UFs) 415, a VN for data fusion (DF) 420 and a VN for cache (Ch) 425, a VN for events (Ev) 430, a VN for sensing (Se) 435, and a VN for actuation (Ac) 440.

In one or more embodiments, each Data Type (DT) is considered to be unique, and several VNs can provide data of the same data type. Moreover, the output data of a VN is of a single data type. The Service Providers (SePs) define and describe the data types available in the system and provide them in a catalogue. In some embodiments, the data type can be considered a non-negotiable requirement. Several VNs that provide the same data type are alternatives to meet a request. Data freshness, however, is a negotiable requirement. Ideally, each VN should update its data upon its allocation to each application request, in order to meet all requests with best (zero) data freshness. However, data updates require the VN to coordinate the engagement of the underlying CoS (Cloud Object Storage) infrastructure, thus incurring a given processing load on it. Besides consuming energy/bandwidth resources, the execution of a data update procedure has a delay for meeting the request.

This delay is divided into two parts. The first delay is with respect to accomplishing a processing load necessary for data acquisition, and the respective time for completing this first part can vary as a function of the number of processors dedicated to the VN. The second delay is with respect to a fixed amount of time, during which the collection of data must occur.

For data types that describe a signal, or a multi-sample data, s is set to a sampling rate described by the data type t. There is a waiting time also described by the type t (or an equivalent number of samples at the given sampling rate) while several samples are collected in sequence. After this time, the data has maximum freshness (zero seconds). Then, a processing may occur to make the data ready within the VN, including, for example, filtering, parsing and insertion of this data in a database. Therefore, by the end of the data update procedure, the data freshness will have been delayed. Both the processing due to the output data type and the request procedure incur delays.

To avoid the constant re-execution of processing loads by the underlying CoS infrastructure, it is possible to meet requests by simply re-using data outputs stored locally within the VN. This data is stored from previous data updates and can be reused, provided that such data meets the data freshness requirement of the requests. Thus, only requests demanding fresher data than the one currently stored in a VN will require data updates, minimizing the system overhead.

It is important to consider that each VN has substantially the same architecture and runs the processes described by their data types. A request is designed for a given data type t, thus any ECN h that provides t, will process the request with the same processes described for t. Therefore, if a request j can be allocated to two different VNs ht, there will be two different ECNs providing the same data type t.

Processing loads are also a property of the data type. Such a load comprises all the control process of a VN when handling a request. The processing load before update comprises the following procedures: receiving the request, parsing it, put it to wait for predecessors if they exist, obtain the inputs, wake up and if necessary, call the function to perform the data update. This is the processing load required for handling any request of type t (control load only) within a VN that provides type t, before performing a data update.

The Transmission Load of a given data type is given by its size, measured in bytes. This is the size of the data that has to be transmitted when the VN finishes meeting the request.

Moreover, a Data Type t can be composite and formed by other Data Types. Each Data Type contains the information of one or more other data types that are required as input data by its respective information fusion technique that will generate its output data. A matrix that shows which edge/cloud node can provide each type t is also stored in some embodiments.

In one or more embodiments, resource provisioning considers that an ECN has to have access locally to sources of all the types of raw sensor data required by a given data type t that will be provided through a VN. In turn, resource allocation will consider only the output data type t of a VN that is requested by an application. It is important to mention that the result of the provisioning decision that was taken for previous windows is available to the CRPAM to use in the moment it is planning the next window's allocation and provisioning actions.

The times for reconfiguring a VN, turning a VN on and turning a VN off are also inputs for the optimization engine. For these three times, when the ECN boots and starts existing in the system, a setup procedure can be performed. After discovering which of the data types it is able to provide, a procedure to retrieve the aforementioned times is triggered for each possible data type.

Regarding each Edge Application (App), the exemplary application model follows a workflow-based approach, similar to the approach seen in the area of Web Services. Users model an application as a workflow that comprises several activities. In one or more embodiments of the present disclosure, each activity of an application workflow is called as an Edge Application Request (RQ). A request is a logical interface to the data provisioning service implemented by VNs. Therefore, requests do not hold any implementation of services.

In addition, for each request, users define a set of requirements. Consider two categories of requirements in some embodiments: non-negotiable, which must be completely fulfilled (100% fulfillment level), and negotiable, which allow any given level of partial fulfillment, under 100%. In the present disclosure, the data type demanded by each application request is a non-negotiable requirement. Among the negotiable requirements, applications have a response time threshold, and a data freshness threshold. Although such requirements are negotiable, applications will retrieve substantially maximum utility for achieving the best values of each requirement. For example, meeting a request with data freshness of zero seconds or response time of zero seconds will result in the substantially maximum price. It is important to mention that users have values of thresholds and prices. They can choose the values, or the application manager subsystem can categorize users autonomously, and attribute such values to them according to a pricing scheme.

Moreover, applications have Precedences (Pre) among their requests. Formally, each application m forms a digraph $G=(S_{RQ}, S_{PR})$ where $(a, b) \in S_{PR}$ represents that request a must be met before request b. Assume that the digraph G only contains immediate precedence relationships, that is, if $S_{RQ}=\{1,2,3\}$ and $\{(1,2), (2,3)\} \subset S_{PR}$, then $(1,3) \notin S_{PR}$.

In one or more embodiments, the SePs provide the data types in the catalogue, and the standard workflows to obtain each data type. The users will request a given data type, and the system will automatically generate an instance of the standard workflow to obtain the requested data type. It is important to mention that requests that have precedence with other requests must have a data freshness threshold equal to zero, denoting that data must always be updated to meet these requests. This is because the output data of the request must have a value calculated with respect to the recently arrived output data of the predecessor data types. Requests with predecessors will wait in the allocated VN for the arrival of the data of such predecessors to perform their calculations with the incoming data along with the data obtained by the VN internally from sensors (if it exists) as input.

Figure 5:
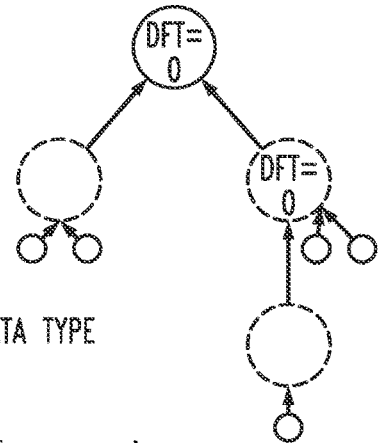
FIG. 5 illustrates an exemplary workflow of a data type requested by a user, according to one embodiment.

FIG. 5 illustrates an exemplary workflow 500 of a data type t requested by a user, according to one embodiment. As shown in FIG. 5, raw data required by each data type is collected. A number of predecessor data types are created, if needed, from the raw data in order to generate the data type t requested by the user. As shown in FIG. 5, one or more data types have a corresponding Data Freshness Threshold (DFT).

In this manner, transformation of the workflows instantiated by users are performed. In some embodiments, this transformation occurs internally in the CRPAM, and is useful to make decisions. Therefore, the users and SePs do not have to be aware of this transformation. This transformation consists on adding start and end requests to the instantiated workflows, as well as precedence to the first and last order requests of the workflow.

Figure 6:
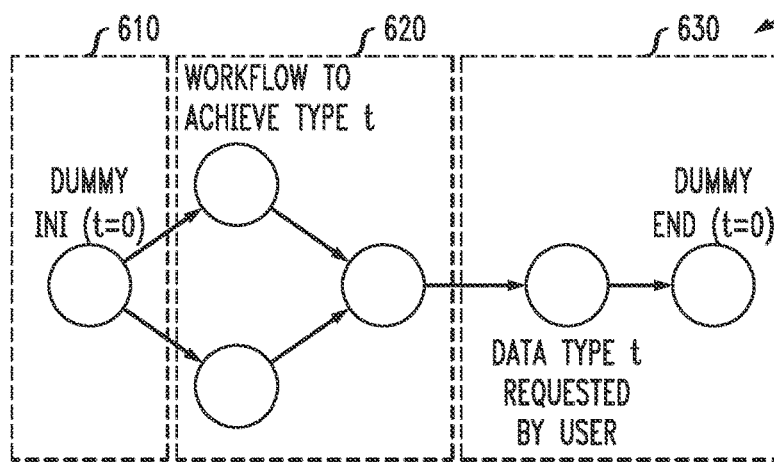
FIG. 6 illustrates an exemplary workflow to produce a data type requested by a user, according to some embodiments.

FIG. 6 illustrates an exemplary workflow 600 to produce a data type requested by a user, according to one embodiment. As shown in FIG. 6, the workflow 620 to achieve the data type t requested by the user comprises a number of tasks (operations). A dummy initialize operation (start request) is performed during step 610. The data type t requested by the user is produced during step 630 and a dummy end operation (end request) is also performed.

In one or more embodiments, start and end requests for each application are provided as inputs, each one marking, respectively, start and end requests j of application m. Start and End requests are internal parameters provided after the preprocessing of the applications arriving (they are used only to make the decision for the window, internally in the CRPAM, and the user does not have to know about it, likewise to the model applications using such start/end requests).

In one or more embodiments of the present disclosure, applications arrive through the Cloud, through Application Entry Points (AEPs). In addition, one data type is reserved to represent the AEP and the data type of start/end requests. Applications are assumed to be finished being performed by an allocated VN (an application starts when the AEP transmits it to a VN, and finishes when a response is given to the user) within the same decision window in which the allocation occurs. In case no allocation was performed for a given application in a previous window, this application will "arrive again" in the current window.

The sets and their respective dimensions, and parameters mentioned herein have to be updated before making the decision respective to the current decision window. In the next section, the decision variables used for modeling the resource provisioning problem are described.

Decision Variables and Optimization Procedure

Equation (1) describes a resource provisioning function, implemented by a reactive resource provisioning process, and Equation (1) describes a resource provisioning and allocation function, according to some embodiments:

$$f_{phy \to vir}(S_{HO}, S_{DT})=S_{VN} \quad (1)$$

$$f_{phy \to vir \to app}(S_{VN}, S_{DT}, S_{AP}, S_{RQ}, S_{PR})=\text{Decision} \quad (2)$$

The resource provisioning function of Equation (1) maps the sets $S_{HO}$ and $S_{DT}$ to the set of VNs ($S_{VN}$) existing for the current decision window. The resource provisioning and allocation function of Equation (1) maps the sets related to applications to the $S_{VN}$, returning a decision that comprises feasible values of decision variables. FIG. 7 illustrates the exemplary decision variables 700 employed in the resource provisioning and allocation problem of Equations (1) and (1).

In the exemplary embodiment of FIG. 7, variables $V_{ht}$, $Vre_{ht}$, $Von_{ht}$, $Voff_{ht}$ and $Vc_{ht}$ are related to the resource provisioning process. The variable $V_{ht}$ is used to decide whether VN ht is active for the current decision window. The Boolean variables $Vre_{ht}$, $Von_{ht}$, $Voff_{ht}$ are used to denote, respectively, whether a VN ht is being reconfigured, turned on, or turned off for the current decision window. The integer variable $Vc_{ht}$ is used to decide the amount of cores (processors) from ECN h dedicated to VN of type t. The amount of RAM required by each VN ht is another resource whose amount configured may also vary with the amount of requests allocated to the VN. However, assume that each VN ht can be dynamically reconfigured regarding the amount of RAM allocated, without the need for a direct reconfiguration, such as the one respective to the number of processors of each VN ht.

The Boolean variables $x_{jh}$ and $y_j$ are related to the resource allocation process. More specifically, $x_{jh}$ is used to associate which VNs ht are allocated to each request j. Indirectly, since in some embodiments only one VN of each type t can run in the same ECN h, the only decision is which ECN h is being allocated to request j, which is of a given data type t. Variable $y_j$ denotes whether the VN ht allocated to request j will update its data to meet this request j.

Finally, the real-valued variables $SIT_j$, $SPB_j$, $STTpre_{jz}$, $SUT_j$ and $SPA_j$ are also related to the resource allocation process, but they refer to the lifecycle of each request j. Therefore, the sequence of execution of the system is describe, and then the specific lifecycle of each request j, within the sequence of execution.

In one or more embodiments of the present disclosure, the sequence of execution of the system occurs as follows. In the Application Manager Subsystem (AMS), the Service Providers (SePs) will create the catalogue of available data types and the respective standard workflows of each type (each standard workflow is a sequence of type t). End users, using a component called Application Manager Subsystem (AMS), request a given data type t. Upon this action, the AMS instantiates a copy of the workflow described by the data type t that is used to form it. These workflows instantiated by the AMS are in fact the applications in the disclosed resource allocation and provisioning system, with each activity of such workflows being considered as the requests in the disclosed resource allocation and provisioning system, that are submitted to execution.

Then, the AMS sends to the CRPAM (at the cloud) its instances of workflows. A buffer is filled with the incoming applications in the CRPAM, so that the decision can be taken optimally for a set of applications at once, and for the whole decision window. When the buffer expires, a resource provisioning and allocation decision is made. When the decision starts being executed, first the new required VNs that are required by the applications in the buffer are created.

Simultaneously, the Application Entry Point (AEP) transmits every request immediately to its allocated VN when such VNs already exist from previous window. When the new VNs are ready being instantiated, the AEP transmits the requests allocated to them immediately. When every request arrives at its VN, the request can either wait for the output data of its preceding requests, or start being served by the VN, in case the request has no predecessors.

During its service by the VN, the request may also ask for a data update from the VN, thus a data update can be either performed or not during such a service for a request. When the request is finished processing, then its output data is transmitted to the other VNs that are holding the successor requests to this request. If no more successor requests exist, the data is transmitted to the AEP, which forwards this data to the user.

FIG. 8 is a flow chart illustrating an exemplary implementation of a request lifecycle process 800, according to one embodiment of the disclosure. Generally, the lifecycle of each request starts in step 805 and occurs as follows. From each request j viewpoint, the request should undergo an initial transmission during step 810, typically starting as soon as possible, from the AEP to the allocated VN ht. This start is identified by $SIT_j$. Consider that the AEP can optionally perform several initial transmissions simultaneously, while a VN can handle such arrivals of requests also simultaneously (either among themselves or in parallel with another process, except for it should start after the VN ht is finished being provisioned in current window). The request arrives at the VN during step 815. However, for the same request j, this initial transmission must be finished before the next stage of processing starts. This next stage is referred to by variable $SPB_j$, which marks the start of a processing before during step 820 the possibility of performing a data update to meet the request. This processing before update cannot be overlapped with any other processing (before update, during update or after update) in the VN. The end of this processing at step 825 will result in the request being enqueued during step 830 in the VN, to wait for the end of transmissions of all of its predecessors (detected at step 845). When there are predecessors and the data from the predecessors arrived in the VN during step 835, the predecessors restriction is removed from the request during step 840, and control flow returns to step 830 and continues in the manner described above.

The next request with no predecessors is obtained during step 850. A test is performed during step 855 to determine if a data update needs to be performed in the VN. If a data update is needed, the update is performed during step 860. The processing after the update is performed during step 865. A test is performed during step 870 to determine if the request has a successor. If the request has a successor, a transmission to the VN holding the sucessor request occurs during step 875 and program control proceeds to step 835. If the request does not have a successor, a transmission to the original AEP occurs during step 880 and program control terminates during step 885.

Variable $STTpre_{j,z}$ denotes, for a request j=b, the start of transmission of the output data of each of its predecessor requests j=a. Consider that each of such transmissions can overlap among themselves, and among other processes in VNs. However, the transmission of an output data cannot occur before the output data is obtained in a VN. When all predecessor constraints have been satisfied, the data update in the VN can occur, and the start of such data update is denoted by variable $SUT_j$. Right after the data update, a processing may occur, starting at time $SPA_j$. These processes (data update and processing after update) should occur one right after the other for each request j. They can be overlapped with any kind of transmission of another request but cannot be overlapped with processing before update. After the end of processing after update, the output data of request j is ready to be either transmitted to another VN that holds another successor request b, or transmitted to the original AEP.

A substantially optimal decision must be taken for the considered utility. This is performed in two main steps. First, a utility function is defined, alongside all of the constraints from the disclosed resource allocation and provisioning system and auxiliary variables. The following Examples section shows an example of profit-based model. Then, for each window, an optimization procedure is performed. The size of the problem and the amount of variables turns the analytical resolution unfeasible in practical time. Thus, in real time, an alternative is required. Heuristics or meta-heuristic algorithms are a solution to this issue: Instead of solving a problem of combinatorial complexity, such as the one that have binary variables as decisions, the problem is solved by selecting the most fit individuals and combining them. In at least one embodiment of this invention, this algorithm can be a genetic algorithm.

FIG. 9 illustrates a resource allocation and provisioning process 900, according to some embodiments. As shown in FIG. 9, two requests 910-1 and 910-2 are processed by the CRPAM 920, which needs to make decisions regarding the two requests 910. In request 910-1 for a data type a, data freshness (DF) requirements (e.g., 100 milliseconds (ms)) are strict, and, in order to not violate the imposed data freshness constraints, the CRPAM 920 decides to allocate VN 1 to process the request 910-1 in one edge node 940-1 through 940-N of edge resources 945, such as edge node 940-1. On the other hand, request 901-2 for a data type b has data freshness requirements (e.g., 10000 ms) that can be fulfilled by either cloud resources 930 or an edge node 940 of the edge resources 945. The cloud resources 930 offer a lower cost. Thus, the exemplary CRPAM 920 forwards the second request 910-2 to the cloud resources 930, and allocates VN 2 in the cloud resources 930 to fulfill request 910-2.

FIG. 9 also illustrates that the CRPAM 920 jointly considers edge resources 945 and cloud resources 930 in order to decide where to place the virtual nodes (VN1 and VN2). In addition, FIG. 9 illustrates the data virtualization aspect of the proposed architecture. As shown in FIG. 9, VN 1 and VN 2 consult a data repository 950 of acquired data to perform its computations. If data types a and b require the same input to be computed, they can consult the same piece of data from the data repository 950 (thus, data acquisition and usage are decoupled in some embodiments).

Figure 10:
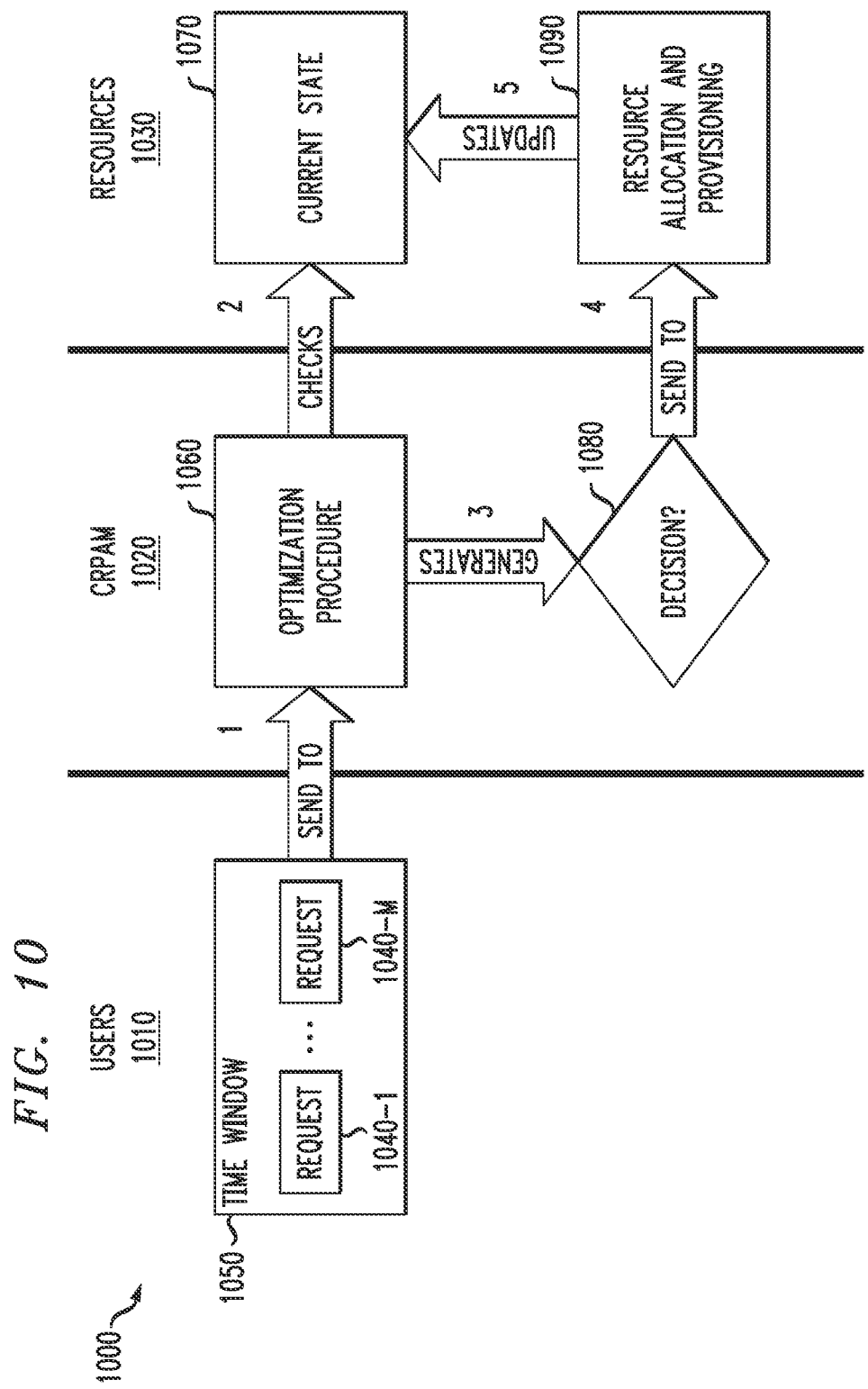
FIG. 10 illustrates a resource allocation and provisioning pipeline, according to one or more embodiments.

FIG. 10 illustrates a resource allocation and provisioning pipeline 1000, according to one or more embodiments. As shown in FIG. 10, one or more requests 1040-1 through 1040-M are received from one or more users 1010 during a time window 1050. The requests are sent during step 1 to an optimization procedure 1060 performed by the CRPAM 1020. The optimization procedure 1060 checks the current state 1070 of the resources 1030 during step 2 and generates a resource allocation and provisioning decision 1080 during step 3.

The resource allocation and provisioning decision 1080 is sent to a resource allocation and provisioning module 1090 during step 4, which implements the resource allocation and provisioning decision 1080 and updates the current state 1070 of the resources 1030 during step 5.

Examples

The amount of data generated from multiple sources is growing exponentially. In addition to data from traditional Internet applications and social media, in recent years, with the advent of the Internet of Things (IoT), a number of sensors are also generating data. The data can come from heterogeneous devices such as smartphones, tablets, wearable sensors and household appliances that are now connected to the Internet. This enormous amount of data generates a problem for cloud-based applications: It would be cumbersome to move all of this generated data to the cloud to then analyze it. A promising solution is to perform some of the analytics and data thinning process on the Edge of the network. Furthermore, virtualization of the data acquisition process prevents energy waste by abstracting the data acquisition portion of the applications.

Health Monitoring Example

In addition, some of the collected data might have associated privacy issues. For example, a person wearing sensing devices would not feel secure if his or her health monitoring data was sent to the cloud in its raw state.

Combining these problems of cloud applications in the IoT environment, health monitoring is one application that benefits from the disclosed resource allocation and provisioning approach.

For the sake of clarification, assume that a person is being monitored for stroke risk, blood pressure and body temperature. Besides the physical devices (sensors) instrumenting the person to collect the body variables, each of these monitors can be thought of as an application submitted by a physician. It is ideal that strokes are predicted as soon as possible, and edge processing makes sense in this case. Furthermore, by defining a response time and a data freshness threshold, the physician can be confident that the alarms generated by this application are a result of data collected recently.

An exemplary application pipeline would be as follows: The physician requests these three applications, which might use data from sensors of wearables or even information derived from the other applications (monitor of stroke risk would use blood pressure as input, for example). Assume that edge devices are available and with negligible distance to the user if compared to cloud nodes. At the first time these applications are solicited, the resource allocation and provisioning procedure will place the virtual nodes that compute these metrics on one of the Edge Nodes in the network.

This service would be provided periodically, and in each decision window, one or more requests for the generated data would appear. The exemplary resource allocation and provisioning procedure ensures that the data comes within acceptable response times, with the specified data freshness and spending the least amount of energy.

Profit-Based Model Example

Consider a profit-based model for resource provisioning and allocation expressed by an optimization problem. Equations (3) to (47) describe an objective function of the resource allocation and provisioning problem. In addition, the constraints of the resource allocation and provisioning problem are also described, defined per Equations (48) to (69). The exemplary resource allocation and provisioning problem seeks to substantially maximize the profits of the system. In other words, the income should be substantially maximized, while minimizing the costs of the cloud/edge system. This relationship is expressed by Equation (3). Equations (4) and (32) depict, respectively, the total costs and incomes mentioned in Equation 3.

FIGS. 11A and 11B, collectively, comprise a table 1100 summarizing the input parameters of the exemplary resource allocation and provisioning system, according to one exemplary embodiment.

Consider the following equations, explained hereinafter, with respect to the decision variables 700 of FIG. 7 and the table 1100 of FIGS. 11A and 11B summarizing the input parameters of the exemplary resource allocation and provisioning system:

$$\max(I - C) \quad (3)$$

where:

$$C = Cre + Con + Coff + Cpr + Cup + Ctr + Cra + Cb \quad (4)$$

$$Cre = \sum_{ht} Vre_{ht} * CTre_{ht} \quad (5)$$

$$Con = \sum_{ht} Von_{ht} * CTon_{ht} \quad (6)$$

$$Coff = \sum_{ht} Voff_{ht} * CToff_{ht} \quad (7)$$

$$Cpr = \sum_{j} ((PB_j + PA_j) * CprUn_j) \quad (8)$$

$$PB_j = \frac{PLoBU_j}{TxProc_j} \quad \forall j \in S_{RQ} \quad (9)$$

$$PA_j = \frac{PLoAU_j}{TxProc_j} \quad \forall j \in S_{RQ} \quad (10)$$

$$TxProc_j = \sum_{t} (x_{jh} \times (Vpr_{ht} * Hcs_h)) \quad \forall j \in S_{RQ} \quad (11)$$

$$CprUn_j = \sum_{ht} (xVN_{jht} * (Vpr_{ht} * Pcpu_h * Cel_h)) \quad \forall j \in S_{RQ} \quad (12)$$

-continued $$xVN_{jht} = (x_{hj}^T * R_{jt}) \quad \begin{array}{l} \forall j \in S_{RQ} \\ \forall h \in S_{HO} \\ \forall t \in S_{DT} \end{array} \quad (13)$$

$$EPB_j = SPB_j + PB_j \quad \forall j \in S_{RQ} \quad (14)$$

$$EPA_j = SPA_j + PA_j \quad \forall j \in S_{RQ} \quad (15)$$

$$Cup = \sum_{jh}(UT_j * CprUn_j) \quad (16)$$

$$UT_j = y_j * \left(\frac{ULor_j}{TxProc_j} + UTmr_j\right) \quad \forall j \in S_{RQ} \quad (17)$$

$$EUT_j = SUT_j + UT_j \quad \forall j \in S_{RQ} \quad (18)$$

$$Ctr = \sum_{jz}(TTpre_{jz} * Ptrpre_{jz}) + \sum_j (IT_j * PtrrAEP_j) \quad (19)$$

$$TTpre_{jz} = \begin{cases} 0 & (z.b \neq j) \\ \frac{TLor_{z.a}}{BRr_{z.a.b}} & (z.b = j) \end{cases} \quad \begin{array}{l} \forall j, a, b \in S_{RQ} \\ \forall z \in S_{PR} \end{array} \quad (20)$$

$$BRr_{ja} = ((x_{jh} \times BR_{hi}) \times x_{ia}^T) \quad \forall j, a \in S_{RQ} \quad (21)$$

$$IT_j = \frac{RSz_j}{\sum_i\left(\left(\sum_h\left(\left(\sum_t AEP_{ht}\right) * BR_{hi}\right)\right) * x_{ji}\right)} \quad \forall j \in S_{RQ} \quad (22)$$

$$Ptrr_{ja} = ((x_{jh} \times (Ptr_{hi} * Cel_h)) \times x_{ia}^T) \quad \forall j, a \in S_{RQ} \quad (23)$$

$$Ptrpre_{jz} = Ptrr_{z.a.z.b} \quad \begin{array}{l} \forall j, a, b \in S_{RQ} \\ \forall z \in S_{PR} \end{array} \quad (24)$$

$$PtrrAEP_j = \sum_i\left(\left(\sum_h\left(\left(\sum_t AEP_{ht}\right) * Ptr_{hi} * Cel_h\right)\right) * x_{ji}\right) \quad \forall j \in S_{RQ} \quad (25)$$

$$EIT_j = SIT_j + IT_j \quad \forall j \in S_{RQ} \quad (26)$$

$$ETTpre_{jz} = STTpre_{jz} + TTpre_{jz} \quad \begin{array}{l} \forall j \in S_{RQ} \\ \forall z \in S_{PR} \end{array} \quad (27)$$

$$ETT_j = \text{Max}_z(ETTpre_{jz}) \quad \forall j \in S_{RQ} \quad (28)$$

$$STT_j = \text{Min}_z(STTpre_{jz}) \quad \forall j \in S_{RQ} \quad (29)$$

$$Cra = \sum_{ht}(((x_{hj}^T \times R_{jt}) * Tram_t) * Pram_h * Cel_h * ETMDW) \quad (30)$$

$$Cb = \sum_h (Pbase_h * Cel_h * ETMDW) \quad (31)$$

$$I = Idf + Ire \quad (32)$$

$$Idf = \sum_j (Udf_j * DFP_j) \quad (33)$$

$$Udf_j = \begin{cases} 0 & (DF_j > DFT_j) \\ 1 - \frac{DF_j}{DFT_j} & (DFT_j \geq DF_j \geq 0) \end{cases} \quad \forall j \in S_{RQ} \quad (34)$$

$$DF_j = SPT_j - LEUT_j + Der_j \quad \forall j \in S_{RQ} \quad (35)$$

$$LEUT_j = ((PrevDUOc_j) * (LEUTcw_j)) + ((1 - PrevDUOc_j) * (LEUTpw_j)) \quad \forall j \in S_{RQ} \quad (36)$$

$$LEUTpw_j = \sum_t (x_{jh} \times EUTpw_{ht}) \quad \forall j \in S_{RQ} \quad (37)$$

$$PrevDUOc_j = \left(\left(\sum_a PrevRQsVNsY_{ja}\right) \geq 1\right) \quad \forall j \in S_{RQ} \quad (38)$$

$$PrevRQsVNsY_{ja} = RQsVNsY_{ja} * (RQsVNsYEUT_{ja} \leq EUT_j) \quad \forall j, a \in S_{RQ} \quad (39)$$

$$LEUTcw_j = \text{Max}_a(PrevEUT_{ja}) \quad \forall j \in S_{RQ} \quad (40)$$

$$PrevEUT_{ja} = RQsVNsYEUT_{ja} * (RQsVNsYEUT_{ja} \leq EUT_j) \quad \forall j, a \in S_{RQ} \quad (41)$$

$$RQsVNsYEUT_{ja} = RQsVNsY_{ja} * EUT_a \quad \forall j, a \in S_{RQ} \quad (42)$$

$$RQsVNsY_{ja} = RQsVNs_{ja} * y_a \quad \forall j, a \in S_{RQ} \quad (43)$$

$$RQsVNs_{ja} = \text{Max}_{ht}((xVN_{jht} + xVN_{aht}) == 2) \quad \forall j, a \in S_{RQ} \quad (44)$$

$$Ire = \sum_m (Ure_m * REP_m) \quad (45)$$

$$Ure_m = \begin{cases} 0 & (RE_m > RET_m) \\ 1 & (RET_m \geq RE_m \geq 0) \end{cases} \quad \forall m \in S_{AP} \quad (46)$$

$$RE_m = \sum_j ((Er_{mj} - Sr_{mj}) * EPT_j) \quad \forall m \in S_{AP} \quad (47)$$

Subject to:

$$Voo_{ht} = V_{ht} - Vpw_{ht} \quad \begin{array}{l} \forall h \in S_{HO} \\ \forall t \in S_{DT} \end{array} \quad (48)$$

$$Voo_{ht} = 1 \rightarrow \begin{cases} Voff_{ht} = 0 \\ Von_{ht} = 1 \\ Vre_{ht} = 0 \end{cases} \quad \begin{array}{l} \forall h \in S_{HO} \\ \forall t \in S_{DT} \end{array} \quad (49)$$

$$Voo_{ht} = -1 \rightarrow \begin{cases} Voff_{ht} = 1 \\ Von_{ht} = 0 \\ Vre_{ht} = 0 \end{cases} \quad \begin{array}{l} \forall h \in S_{HO} \\ \forall t \in S_{DT} \end{array} \quad (50)$$

$$Voo_{ht} = 0 \rightarrow \begin{cases} Voff_{ht} = 0 & \forall h \in S_{HO} \\ Von_{ht} = 0 & \forall t \in S_{DT} \end{cases} \quad (51)$$

$$Vc_{ht} \neq Vcpw_{ht} \rightarrow Vre_{ht} = 1 \quad \begin{array}{l} \forall h \in S_{HO} \\ \forall t \in S_{DT} \end{array} \quad (52)$$

$$Vre_{ht} = 1 \rightarrow \begin{cases} Voo_{ht} = 0 & \forall h \in S_{HO} \\ V_{ht} = 1 & \forall t \in S_{DT} \end{cases} \quad (53)$$

$$\sum_h V_{ht} \geq D_t \quad \forall t \in S_{DT} \quad (54)$$

$$\sum_h x_{jh} \leq 1 \quad \forall j \in S_{RQ} \quad (55)$$

$$y_j = 1 \rightarrow \sum_h x_{jh} = 1 \quad \forall j \in S_{RQ} \quad (56)$$

$$V_{ht} \leq P_{ht} \quad \begin{array}{l} \forall h \in S_{HO} \\ \forall t \in S_{DT} \end{array} \quad (57)$$

-continued $$\sum_t Vpr_{ht} \leq Hc_h \quad \forall\, h \in S_{HO} \quad (58)$$

$$\sum_t ((x_{hj}^T \times R_{jt}) * Tram_t) \leq Hram_h \quad \forall\, h \in S_{HO} \quad (59)$$

$$x_{jh} \times V_{ht} = R_{jt} \quad \begin{array}{l} \forall\, j \in S_{RQ} \\ \forall\, t \in S_{DT} \end{array} \quad (60)$$

$$SUT_j \geq ETT_j \quad \forall\, j \in S_{RQ} \quad (61)$$

$$SPA_j = EUT_j \quad \forall\, j \in S_{RQ} \quad (62)$$

$$AEP_{ht} * V_{ht} = AEP_{ht} \quad \begin{array}{l} \forall\, h \in S_{HO} \\ \forall\, t \in S_{DT} \end{array} \quad (63)$$

$$SIT_j \geq \sum_{ht} xVN_{jht} * \quad \forall\, j, a \in S_{RQ} \quad (64)$$

$$(Von_{ht} * Ton_{ht} + Vre_{ht} * Tre_{ht}) \quad \forall\, z \in S_{PR}$$

$$STTpre_{jz} \geq EPA_{z,a} \quad \begin{array}{l} \forall\, j, a \in S_{RQ} \\ \forall\, z \in S_{PR} \end{array} \quad (65)$$

$$EPA_a \leq SUT_b \quad \forall\, (a, b) \in S_{PR} \quad (66)$$

$$EPA_j \leq ETMDW \quad \forall\, j \in S_{RQ} \quad (67)$$

$$(xVN_{aht} * SUT_a \geq xVN_{bht} * EPA_b) \quad \forall\, a, b \in S_{RQ} \quad (68)$$
$$\text{or} \quad (a \neq b)$$
$$(xVN_{aht} * EPA_a \leq xVN_{bht} * SUT_b) \quad \begin{array}{l} \forall\, h \in S_{HO} \\ \forall\, t \in S_{DT} \end{array}$$

$$(xVN_{aht} * SUT_a \geq xVN_{bht} * EPB_b) \quad \forall\, a, b \in S_{RQ} \quad (69)$$
$$\text{or} \quad (a \neq b)$$
$$(xVN_{aht} * EPA_a \leq xVN_{bht} * SPB_b) \quad \begin{array}{l} \forall\, h \in S_{HO} \\ \forall\, t \in S_{DT} \end{array}$$

The total costs are calculated through Equations (5) to (31).

Equations (5), (6) and (7) calculate the total costs of, respectively, reconfiguring, turning on and turning off each VN, for the current decision window.

Equation (8) calculates the total costs due to processing requests in VNs. The total times spent for processing request j respectively before and after the update are given by $PB_j$ and $PA_j$. These times are calculated through, respectively, Equations (9) and (10). The end times of processing before update and processing after update are calculated through Equations (14) and (15), respectively. Equation (11) calculates the $TxProc_j$, which is the processing speed of request j, i.e. the amount of cycles per second that will be applied to the respective processing load (measured in cycles). By Equation (12), $CprUn_j$ is the cost of one second of processing of request j, according to the VN ht in which it was allocated. This is the cost of processing one unit of time of request j, which was effectively achieved (effectively achieved, because it varies with the chosen configurations of number of processors of the VN ht allocated to request j). The matrix $xVN_{jht}$ is calculated by Equation (13), and represents exactly in which VN ht a request j was allocated (it is a three-dimensional matrix).

Equation (16) states that the total cost related to the execution of data update procedures for all requests j is a function of the individual data update times for each request j, multiplied by the same $CprUn_j$ calculated in Equation (12). By Equation (17), each data update time is calculated as a function of the decision taken regarding the execution of data updates for requests j or not, and the both time parts of the data update procedures, respectively the one respective to the processing load (which is a function of the processing power dedicated to the VN) and the one respective to the fixed data acquisition time. Equation (18) calculates the end of update times of requests j.

Equation (19) calculates the total transmission costs of the system. This total transmission cost is divided into two parts. The first is the transmission of messages respective to precedences of requests (transmissions of output data of predecessors). The second is the transmission of the requests themselves (initial transmissions), from the AEP to the VN ht that was allocated to request j.

Equation (20) calculates the transmission time of each predecessor request of request j. For each pair of precedences z, if z.b is the request j, then the transmission time associated with this precedence z for request j ($TTpre_{jz}$)is calculated based on the transmission load of the predecessor request (z.a) and the bit rate of transmission between the requests a and b that compose the pair or precedence.

Equation (21) calculates the bit rate for each pair of requests jxa, based on the bit rates between each pair of ECNs hxi, and the decisions on allocation of each of the requests j and a in, respectively, ECN h and i.

Equation (22) calculates the duration of the initial transmission of each request j. This is calculated based on the standard size of each request j, divided by the bit rate of transmission between the AEP (only one in this work) and the ECN i where the request j was allocated.

Equation (23) calculates the power dissipated by each transmission between requests j and a, based on the power dissipated by transmissions between the respective ECNs h and i to which they were allocated.

Equation (24) calculates the power dissipated by each request j due to precedence z.

Equation (25) calculates the power dissipated by the transmission between each request j and its respective AEP.

Equation (26) calculates the end of the initial transmission of each request j. Equation (27) calculates the end of transmission of each predecessor of request j. Equation (28) calculates a unique end of transmission time for request j, as the last end of transmission among its predecessors. Equation (29) calculates a unique start of transmission time for request j, as the first start of transmission among its predecessors. Equation (30) calculates Cra by multiplying two terms. First, in $(x_{hj}^T \times RT_{jt})*Tram_t$, measured in bytes, the total amount of bytes required for each VN ht is calculated, based on the total amount of requests allocated to it and the amount of RAM required by a single request of type t. Then, this term is multiplied by the energy dissipated by one byte during the whole window $Pram_h * Cel_h * ETMDW$. Cra is obtained by summing the result for all VNs ht. Finally, Equation (31) calculates the base costs for all ECNs.

The total incomes are calculated through Equations (33) to (47).

According to Equation (33), Idf is the total income due to meeting data freshness requirements of requests. The $Udf_j$ is the utility (0-100%) of data freshness obtained for a request j, calculated through Equation (34). In one or more embodiments, utilities decrease linearly as the value obtained for the negotiable requirement moves towards the respective threshold. Other functions could also be considered, such as either an exponential decreasing, or a step function (if the response time or data freshness obtained is below a given number, the application returns a given fixed income, while above this number no income is returned), and this last case allows us to categorize applications into service ranges (there should be gold, silver and bronze applications, rated according to their possible incomes and restrictive thresholds).

According to Equation (35), $DF_j$ is the data freshness of request j in the moment it is met. It calculated as the start of processing time of request j, subtracted by the last end of update time detected for request j. This last end of update time can be the end of update time most recently occurred for the same request j. In addition, the data freshness effectively obtained is not calculated exactly based on the last end of the update time. It is shifted by the constant input parameter $Der_j$.

According to Equations (36), (37) and (38) define the matrixes $LEUT_j$, $LEUTpw_j$ and $PrevDUOc_j$. Such matrixes are used together to define whether the last end of update time is considered that occurred in the current window, or the last end of update time achieved in a previous window.

According to Equation (39), $PrevRQsVNsY_{ja}$ stores the data updates performed for VN ht of request j due to other requests a, when such updates ended before request j.

According to Equation (40), $LEUTcw_j$ stores the last end of update time in current window for each request j, which could either have occurred for request j itself, in the moment where it was met, as well as for any other request performed previously in VN ht, or have not occurred yet during this window.

According to Equation (41), $PrevEUT_{ja}$ is defined as follows. By comparing the $RQsVNsYEUT_{ja}$ values with the $EUT_j$ values, if $RQsVNsYEUT_{ja} \leq EUT_j$ can be defined. If this comparison is false, then the value for request j in this matrix is transformed to zero. Then, for each request j, only the values of $EUT_a$ that happened previously to $EUT_j$ will remain in this matrix.

According to Equation (42), $RQsVNsYEUT_{ja}$ stores, for each request j, the ends of updates of all the requests a that were allocated to the same VN ht of request j, with data updates occurred.

According to Equation (43), for each request j, $RQsVNsY_{ja}$ contains all the requests a that were allocated to the same VN ht of request j and had data updates performed for themselves.

Equation (44) calculates $RQsVNs_{ja}$, which is a matrix that contains, for each request j, all the requests a that were allocated to the same VN ht of request j.

Equations (45), (46) and (47) state how the incomes respective to meeting response time requirements are calculated. Where $Ure_m$ is the utility (0-100%) of response time obtained for an application m, and $RE_m$ is the response time obtained for the application m, measured in seconds.

Equations (48) to (69) describe the constraints of the resource allocation and provisioning problem.

Equations (48) to (53) describe implication constraints that are specific for the provisioning process. By assessing the differences between the VNs existing in a previous window and in a current window, i.e. $Voo_{ht}$ in Equation (48), the values of $Voff_{ht}$, $Von_{ht}$ and $Vre_{ht}$ in Equations (49), (50) and (51) can be inferred. In addition, $Voo_{ht}$ is a matrix that stores information regarding state changes (on/off) for each VN. By assessing the number of cores dedicated to each VN in previous and current windows, $Vre_{ht}$, as in Equation (52) can also be inferred. Equation (53) ensures that a VN must exist if it is being reconfigured in the current window, and that it must not have been turned on or off in current window.

Equation (54) states that each data type that is required by an application must have at least one alternative VN. More than one application can have the same VN as its alternative. Since the objective function minimizes the number of VNs to be created, this constraint is necessary. With this constraint, at least one VN will be created, or reused if preexisting, for each application.

Equation (55) states that each request must have VNs allocated only once.

Equation (56) states that if a data update occurs to request j, then it must have been allocated to any ECN h, i.e. to the respective VN ht.

Equation (57) states that it is not possible to set a VN ht in an ECN h if the ECN h is not able to provide the respective data type t.

Equation (58) states that the number of processors allocated to all VNs ht of an ECN cannot exceed the number of processors of the ECN.

Equation (59) states that the sum of RAM dedicated to all VNs of the ECN cannot exceed the amount of RAM available for the ECN. The expression $x_{hj}^T \times R_{jt}$ returns the number of requests of each type allocated to VN ht. By multiplication with $Tram_t$, to get the matrix that stores information regarding the amount of RAM dedicated to each VN. Consider that there is a fixed amount of RAM required by a single request. Expand it by multiplying for the total amount of requests allocated to VN ht. This is the worst case (as if all requests were to be handled simultaneously). Define another relationship such as the one relying on a decimal factor between 0 and 1 that could multiply the amount of RAM dedicated to the VN for each request allocated to it and would be defined by probabilistic means.

Equation (60) states that it is not possible to allocate a request j to an ECN h that does not provide the correct type t.

Equation (61) states that for the same request j, its start of updating must be larger than the end of transmissions of its predecessors.

Equation (62) states that for the same request j, its start of processing after update must be equal to its end of update.

Equation (63) describes a constraint that ensures the AEPs will exist for the current decision window.

Equation (64) shows that the end of provisioning of a VN ht where a request j was allocated is a function of decisions of turning the VN on or reconfiguring it. The constraint in this equation says that it is not possible to allocate a start of initial transmission of a request j to the allocated VN ht before the end of provisioning of this VN ht.

Equation (65) describes a constraint for ensuring that every start time of transmissions of predecessors z.a of request j must occur after the end of processing of z.a in its respective VN.

Equation (66) shows a constraint for ensuring that for each pair of precedences (a, b), the successor b starts its data update only after the end of the processing time after update of predecessor a.

Equation (67) shows a constraint for ensuring that every request must be finished before the end of the decision window.

Equation (69) shows a constraint for ensuring that, for every pair of requests j (a, b) that were allocated to the same VN ht, the times between the start of update and the end of processing after update of both requests must not overlap. In other words, a VN cannot update and process its data for more than one request simultaneously. The pair of requests is not a precedence in the same sense of application's request precedences in $S_{PR}$, stated in the application graph G, but within VN ht, either a will be performed before b or b will be performed after a, denoting a different kind of precedence. Equation (69) is similar, but for preventing overlapping between the process of update and processing after update of each request and the process of processing before update of other requests.

In some embodiments, the disclosed multi-tier service provisioning model improves the allocation of requests to a virtual node in the cloud or a node at the edge level in an edge-cloud system comprised of multiple tiers.

Among other benefits, the disclosed resource allocation and provisioning system jointly considers the resource provisioning and allocation, while distributing the workload both vertically (among the different tiers of the system) and horizontally (among nodes at the same tier) in the edge-cloud framework. The exemplary model improves the utility of the system while meeting the quality requirements of applications using the available resources.

One or more embodiments of the disclosure provide improved methods, apparatus and computer program products for resource allocation and provisioning. The foregoing applications and associated embodiments should be considered as illustrative only, and numerous other embodiments can be configured using the techniques disclosed herein, in a wide variety of different applications.

It should also be understood that the disclosed resource allocation and provisioning techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for resource allocation and provisioning may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based resource allocation and provisioning system, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based resource allocation and provisioning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. These platforms may also be used to implement at least portions of other information processing systems in other embodiments.

Figure 12:
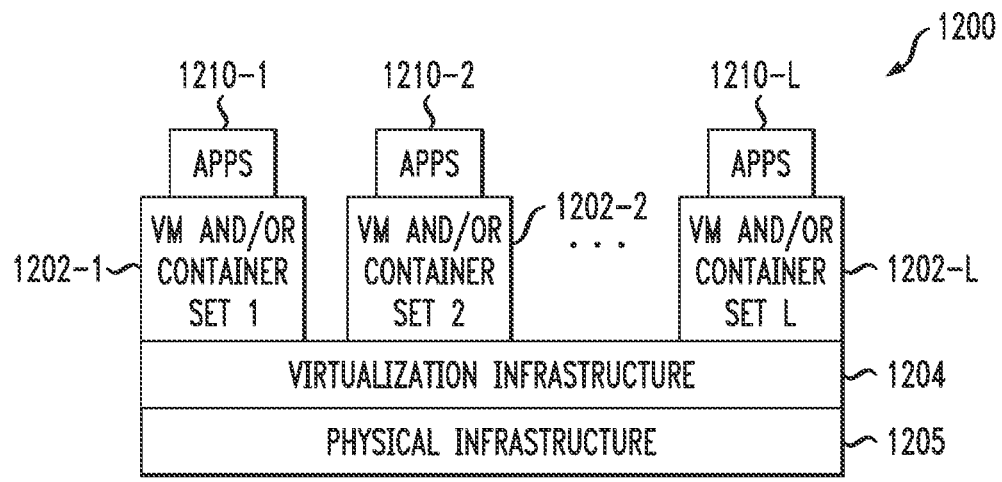
FIG. 12 illustrates an exemplary processing platform that may be used to implement at least a portion of one or more embodiments of the disclosure comprising a cloud infrastructure.

FIG. 12 shows an example processing platform comprising cloud infrastructure 1200. The cloud infrastructure 1200 comprises a combination of physical and virtual processing resources that may be utilized to implement at least a portion of the resource allocation and provisioning system. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. Such implementations can provide resource allocation and provisioning functionality of the type described above for one or more processes running on a given one of the VMs. For example, each of the VMs can implement resource allocation and provisioning control logic and associated resource allocation and provisioning functionality for one or more processes running on that particular VM.

An example of a hypervisor platform that may be used to implement a hypervisor within the virtualization infrastructure 1204 is the VMware® vSphere® which may have an associated virtual infrastructure management system such as the VMware® vCenter™. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system. Such implementations can provide resource allocation and provisioning functionality of the type described above for one or more processes running on different ones of the containers. For example, a container host device supporting multiple containers of one or more container sets can implement one or more instances of resource allocation and provisioning control logic.

As is apparent from the above, one or more of the processing modules or other components of the resource allocation and provisioning system may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises at least a portion of the given system and includes a plurality of processing devices, denoted 1302-1, 1302-2, 1302-3, . . . 1302-K, which communicate with one another over a network 1304. The network 1304 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1302-1 in the processing platform 1300 comprises a processor 1310 coupled to a memory 1312. The processor 1310 may comprise a microprocessor, a microcontroller, an application specific integrated circuit (ASIC), a field programmable gate array (FPGA) or other type of processing circuitry, as well as portions or combinations of such circuitry elements, and the memory 1312, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the given system may include additional or alternative processing platforms, as well as numerous distinct processing platforms in any combination, with each such platform comprising one or more computers, storage devices or other processing devices.

Figure 13:
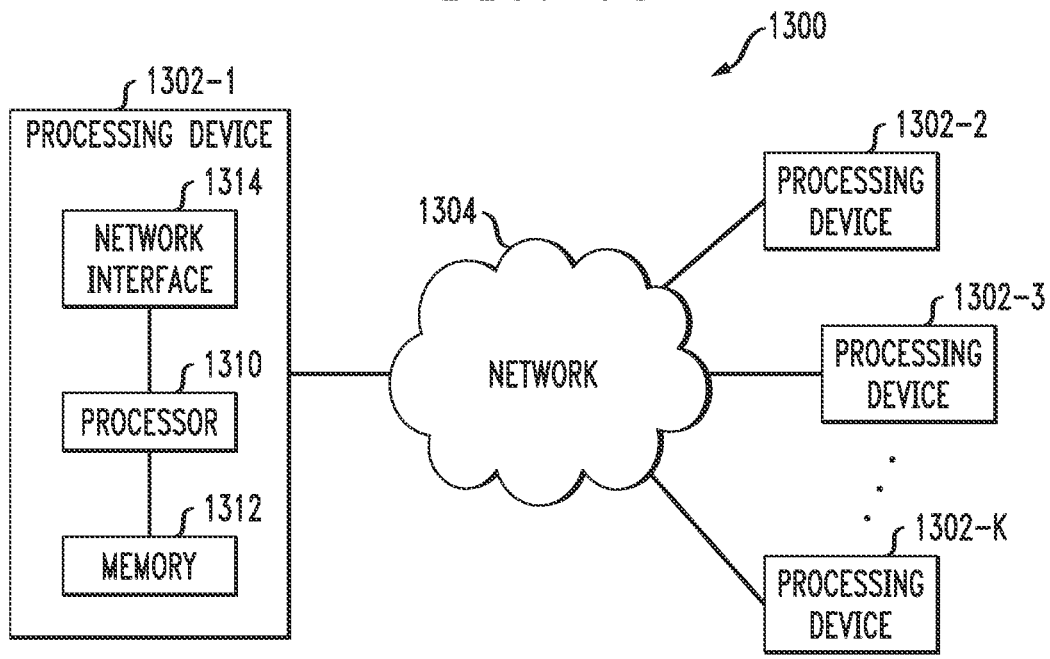
FIG. 13 illustrates another exemplary processing platform that may be used to implement at least a portion of one or more embodiments of the disclosure.

Multiple elements of system may be collectively implemented on a common processing platform of the type shown in FIG. 12 or 13, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining at least one application request, from one or more of a user and a first application, to access a second application, wherein the second application processes data of a given data type in a multi-tier environment comprising cloud resources and a plurality of edge nodes, wherein said application request comprises (i) the given data type, and (ii) a data freshness constraint indicating a time elapsed since an acquisition from a source of the data;

processing, using at least one processing device, one or more application requests received within a decision window to allocate resources for one or more virtual nodes to process the one or more application requests received within the decision window, wherein the allocated resources for each of the one or more virtual nodes are on a corresponding one of: said cloud resources and a given one of said plurality of edge nodes, wherein the resources for the one or more virtual nodes to process the one or more application requests are provisioned to satisfy said data freshness constraint specified for the one or more application requests;

instantiating, using the at least one processing device, the one or more virtual nodes to process the one or more application requests; and providing the one or more application requests to the one or more instantiated virtual nodes for processing by the one or more instantiated virtual nodes, wherein the one or more instantiated virtual nodes obtain from a data repository at least some of the data needed to compute the given data type indicated in said application request.

2. The method of claim 1, wherein the virtual node waits to process a given application request for output data of one or more predecessor requests.

3. The method of claim 1, wherein, upon completion of processing a given application request, the respective virtual node sends the output data of the given application request to one or more additional virtual nodes holding one or more successor requests to the given application request.

4. The method of claim 1, further comprising the step of updating the data based on an evaluation of a time-stamp of the data from the data repository with respect to the data freshness constraint.

5. The method of claim 1, further comprising the step of instantiating a copy of a workflow described by the given data type that is used to form the given data type.

6. The method of claim 1, wherein the data comprises data from one or more Internet of Things devices.

7. The method of claim 1, wherein the allocating employs a utility function based on one or more of a substantially minimum cost and a substantially maximum profit.

8. A system, comprising:

a memory; and at least one processing device, coupled to the memory, operative to implement the following steps:

obtaining at least one application request, from one or more of a user and a first application, to access a second application, wherein the second application processes data of a given data type in a multi-tier environment comprising cloud resources and a plurality of edge nodes, wherein said application request comprises (i) the given data type, and (ii) a data freshness constraint indicating a time elapsed since an acquisition from a source of the data;

processing, using the at least one processing device, one or more application requests received within a decision window to allocate resources for one or more virtual nodes to process the one or more application requests received within the decision window, wherein the allocated resources for each of the one or more virtual nodes are on a corresponding one of: said cloud resources and a given one of said plurality of edge nodes, wherein the resources for the one or more virtual nodes to process the one or more application requests are provisioned to satisfy said data freshness constraint specified for the one or more application requests;

instantiating, using the at least one processing device, the one or more virtual nodes to process the one or more application requests; and providing the one or more application requests to the one or more instantiated virtual nodes for processing by the one or more instantiated virtual nodes, wherein the one or more instantiated virtual nodes obtain from a data repository at least some of the data needed to compute the given data type indicated in said application request.

9. The system of claim 8, wherein the virtual node waits to process a given application request for output data of one or more predecessor requests.

10. The system of claim 8, wherein, upon completion of processing a given application request, the respective virtual node sends the output data of the given application request to one or more additional virtual nodes holding one or more successor requests to the given application request.

11. The system of claim 8, further comprising the step of updating the data based on an evaluation of a time-stamp of the data from the data repository with respect to the data freshness constraint.

12. The system of claim 8, further comprising the step of instantiating a copy of a workflow described by the given data type that is used to form the given data type.

13. The system of claim 8, wherein the data comprises data from one or more Internet of Things devices.

14. The system of claim 8, wherein the allocating employs a utility function based on one or more of a substantially minimum cost and a substantially maximum profit.

15. A computer program product, comprising a non-transitory machine-readable storage medium having encoded therein executable code of one or more software programs, wherein the one or more software programs when executed by at least one processing device perform the following steps:

obtaining at least one application request, from one or more of a user and a first application, to access a second application, wherein the second application processes data of a given data type in a multi-tier environment comprising cloud resources and a plurality of edge nodes, wherein said application request comprises (i) the given data type, and (ii) a data freshness constraint indicating a time elapsed since an acquisition from a source of the data;

processing, using at least one processing device, one or more application requests received within a decision window to allocate resources for one or more virtual nodes to process the one or more application requests received within the decision window, wherein the allocated resources for each of the one or more virtual nodes are on a corresponding one of: said cloud resources and a given one of said plurality of edge nodes, wherein the resources for the one or more virtual nodes to process the one or more application requests are provisioned to satisfy said data freshness constraint specified for the one or more application requests;

instantiating, using the at least one processing device, the one or more virtual nodes to process the one or more application requests; and providing the one or more application requests to the one or more instantiated virtual nodes for processing by the one or more instantiated virtual nodes, wherein the one or more instantiated virtual nodes obtain from a data repository at least some of the data needed to compute the given data type indicated in said application request.

16. The computer program product of claim 15, wherein the virtual node waits to process a given application request for output data of one or more predecessor requests.

17. The computer program product of claim 15, wherein, upon completion of processing a given application request, the respective virtual node sends the output data of the given application request to one or more additional virtual nodes holding one or more successor requests to the given application request.

18. The computer program product of claim 15, further comprising the step of updating the data based on an evaluation of a time-stamp of the data from the data repository with respect to the data freshness constraint.

19. The computer program product of claim 15, further comprising the step of instantiating a copy of a workflow described by the given data type that is used to form the given data type.

20. The computer program product of claim 15, wherein the allocating employs a utility function based on one or more of a substantially minimum cost and a substantially maximum profit.

\* \* \* \* \*